United States Patent
Fujiwara et al.

(10) Patent No.: US 7,336,414 B2
(45) Date of Patent: Feb. 26, 2008

(54) OPTICAL MODULATING DEVICE

(75) Inventors: Masamichi Fujiwara, Funabashi (JP); Junichi Kani, Narashino (JP); Koji Akimoto, Atsugi (JP); Katsumi Iwatsuki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 320 days.

(21) Appl. No.: 10/534,310

(22) PCT Filed: Jun. 16, 2004

(86) PCT No.: PCT/JP2004/008762

§ 371 (c)(1),
(2), (4) Date: May 9, 2005

(87) PCT Pub. No.: WO2004/113998

PCT Pub. Date: Dec. 29, 2004

(65) Prior Publication Data

US 2006/0024066 A1 Feb. 2, 2006

(30) Foreign Application Priority Data

Jun. 19, 2003 (JP) ............................. 2003-174491
Jun. 19, 2003 (JP) ............................. 2003-174499
Jul. 11, 2003 (JP) ............................. 2003-195735

(51) Int. Cl.
*H01S 3/00* (2006.01)
(52) U.S. Cl. ..................... 359/337; 359/341.2; 359/349
(58) Field of Classification Search ................. 359/337, 359/341.2, 349

See application file for complete search history.

(56) References Cited

U.S. PATENT DOCUMENTS 6,452,718 B1 * 9/2002 Augustsson ............... 359/337.1
7,019,893 B2 * 3/2006 Koteles et al. ........... 359/337.1

FOREIGN PATENT DOCUMENTS

CA 2 389 974 12/2002

(Continued)

OTHER PUBLICATIONS

Filip Ohman et al., *Noise Properties and Cascadability of SOA-EA Regenerators*, The 15th Annual Meeting of the IEEE, vol. 2, 2002, pp. 895-896.
Hiroshi Takahashi et al., *Impact of Crosstalk in an Arrayed-Waveguide Multiplexer on N × N Optical Interconnection*, Journal of Lightwave Technology, vol. 14, No. 6, Jun. 1996, pp. 1097-1105.
Neal S. Bergano et al., *Margin Measurements in Optical Amplifier Systems*, IEE Photonics Technology Letters, vol. 5, No. 3, Mar. 1993, pp. 304-306.

*Primary Examiner*—Mark Hellner
(74) *Attorney, Agent, or Firm*—Workman Nydegger

(57) ABSTRACT

An optical modulation apparatus is provided which implements a stable amplifying function by reducing the effect of reflected light rays form end faces of a bidirectional optical amplifier by imposing a numerical limitation on the relationship between the gain of the bidirectional optical amplifier and the loss of the optical modulator, or by inserting a polarization rotation section in a reflection type optical modulator including the bidirectional optical amplifier or in a multi-wavelength collective optical modulation system combining the multiple optical modulators. An optical modulation apparatus is provided which implements a stable amplifying function and cost reduction by reducing the effect of reflected light rays by interposing optical isolators at every alternate SOAs in a transmission-type optical modulation apparatus including a plurality of semiconductor optical amplifiers (SOAs) connected in a multistage fashion.

14 Claims, 16 Drawing Sheets

FOREIGN PATENT DOCUMENTS

| | | |
|---|---|---|
| JP | 10-173597 | 6/1998 |
| JP | 11-046030 | 2/1999 |
| JP | 2002-318374 | 10/2002 |
| JP | 2003-018853 | 1/2003 |
| JP | 2003-069502 | 3/2003 |

* cited by examiner

| SECOND REFLECTION \ FIRST REFLECTION | ref(1) | ref(2) | ref(3) |
|---|---|---|---|
| Ref(0) | r(1)R(0) | r(2)R(0)$g_1^2$ | r(3)R(0)$g_1^2 g_2^2$ |
| Ref(1) | — | r(2)R(1) | r(3)R(1)$g_2^2$ |
| Ref(2) | — | — | r(3)R(2) |

▨ SMALL RATIO OF REFLECTION

FIG.10

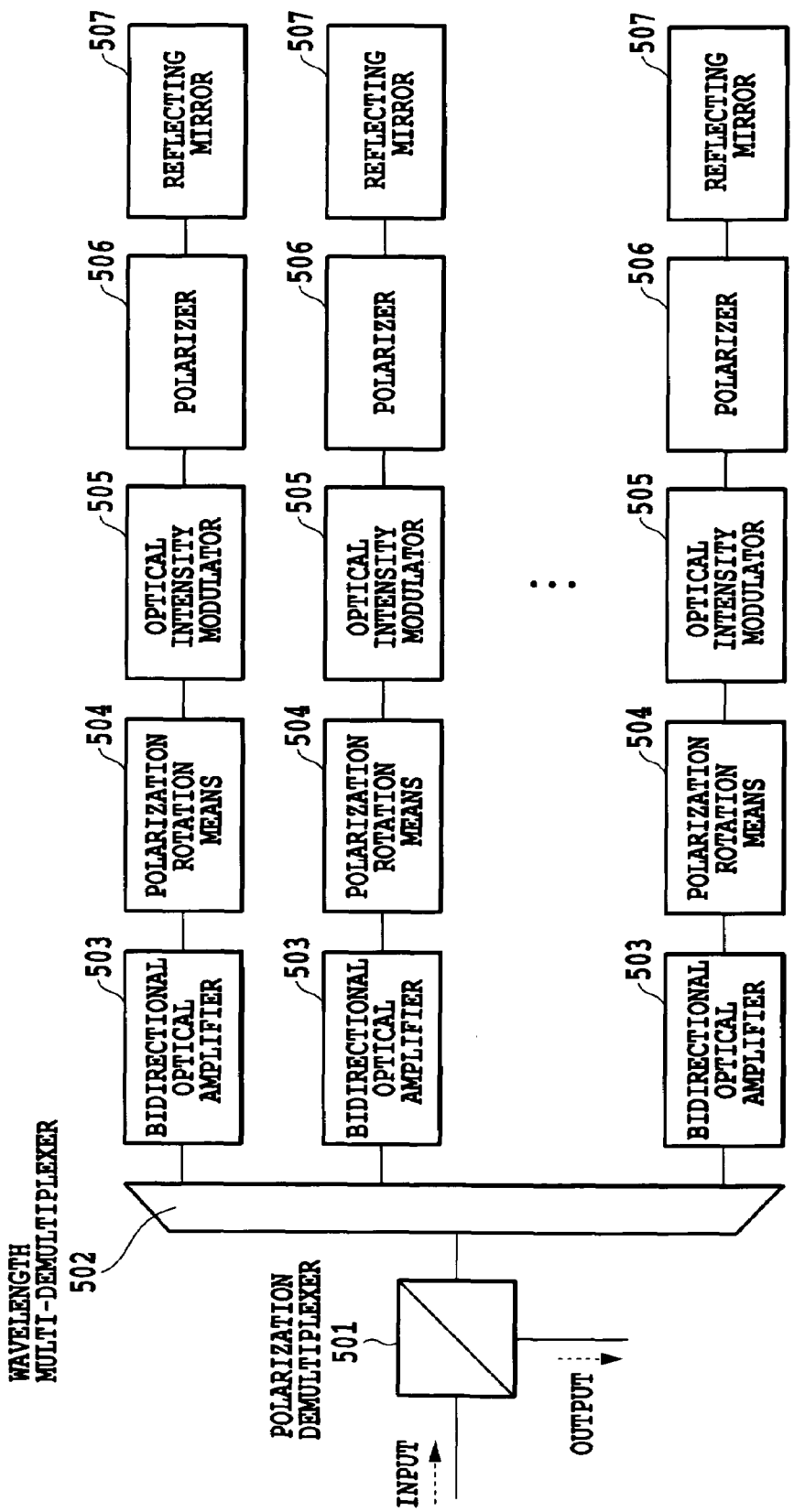

OPTICAL MODULATING DEVICE

TECHNICAL FIELD

The present invention relates to an optical modulation apparatus used for optical communication, and particularly to a constructing technique of the optical modulation apparatus constructed by combining an optical amplifier such as a semiconductor optical amplifier with an optical intensity modulator.

BACKGROUND ART

Conventionally, systems have been studied which apply multi-wavelength light including a plurality of optical carriers generated by an optical short-pulse laser or by amplitude modulation/phase modulation to wavelength division multiplexing (WDM) signal transmission. Such multi-wavelength light has the same spectral spacing between individual side modes so that the channels obtained by wavelength demultiplexing of the side modes have the same wavelength spacing. Accordingly, such multi-wavelength light is simpler in wavelength constellation than multi-wavelength light based on a method of preparing separate lasers for individual channels and setting wavelengths for the individual channels.

To implement a WDM signal transmission system using the multi-wavelength light, one of the important problems is the simplification of the configuration of an optical modulation circuit and its economization. FIG. 1 shows a configuration of a conventional optical modulation circuit. The multi-wavelength light generated by a multi-wavelength light source 101 undergoes wavelength demultiplexing by a wavelength demultiplexer 103, modulating by individual optical intensity modulators 105, and multiplexing by a wavelength multiplexer 107 again. The configuration as shown in FIG. 1 requires two wavelength multi-demultiplexers 103 and 107 having the same absolute value in the transmission central wavelengths. Thus, an optical modulation apparatus with a configuration as shown in FIG. 2 is proposed which includes a wavelength multi-demultiplexer 207, one or more optical intensity modulators 209, and reflecting mirrors 211 equal to the optical intensity modulators in the number (see, Japanese patent application Laid-open No. 2002-318374).

In the optical modulation apparatus as shown in FIG. 2, the multi-wavelength light, which is input to an input port 203 of an optical input section 201, passes through an input/output port 205, and undergoes wavelength demultiplexing by a wavelength demultiplexer 207, modulating by individual optical intensity modulators 209, and reflection by optical reflectors 211. Then, the reflected light rays return the paths they have came with being multiplexed again by the wavelength multiplexer 207 and output from an output port 213 of the input/output means 201. According to the system configuration, it includes only one wavelength multi-demultiplexer 207. Consequently, it can facilitate the matching of the transmission central wavelengths of the wavelength multi-demultiplexer, and reduce the cost of the system.

In either FIG. 1 or FIG. 2, the individual wavelengths have their optical power reduced by the losses of optical devices used by the wavelength multi-demultiplexer and the like. In addition, as for the system having the multi-wavelength light source and the optical modulators placed at a distance physically, the losses of fiber transmission paths linking them become nonnegligible. Since the reduction in the WDM signal power deteriorates the signal-to-noise ratio (SNR), the power must be amplified using an optical amplifier designated by the reference numeral 109 of FIG. 1 or by 215 of FIG. 2.

FIGS. 1 and 2 each show an example which amplifies the WDM signal power at once with a broadband optical amplifier that covers the entire wavelength band of the multi-wavelength light (see, Japanese patent application laid-open No. 2003-18853). The example employs a polarization independent optical amplifier that amplifies the optical intensity without depending on the polarization of the modulated light passing through the wavelength division multiplexing. Such an optical amplifier generally employs a fiber amplifier such as an erbium (Er) doped fiber amplifier (EDFA). The EDFA is an optical amplifier that amplifies the light traveling through the fiber by doping the core of the silica glass fiber with erbium ions $Er^{3+}$, and by utilizing the stimulated emission in the transition proper to the ions. On the other hand, as an optical amplifier used for the optical communication, a semiconductor optical amplifier (SOA) has been developed. The SOA is an optical amplifier that amplifies the light traveling through the active layer of the semiconductor by the stimulated emission by reducing the reflectance of end faces of the cavity of the semiconductor laser.

Although both types of the optical amplifiers have a broad gain bandwidth of 30 nm or more, they differ greatly in the lifetime of carriers in the excited level. Since the EDFA has the gain broadening established by the transition from a plurality of discrete excitation energy levels, it has a long carrier lifetime of an order of milliseconds, and uneven gain broadening. In contrast with this, the SOA has a short carrier lifetime of an order of nanoseconds, and the gain broadening can be considered as uniform. Generally, the optical amplifier operates in the saturation region of the gain to obtain large output. When the optical amplifier with the uniform gain broadening amplifies a plurality of different signal wavelengths in the saturation region of the gain, the individual wavelengths scramble for the gain, which causes crosstalk between the channels and degrades the signal waveform. Accordingly, fiber amplifiers such as the EDFA are usually used to amplify the WDM signal collectively as described above. However, comparing the SOA that excites the semiconductor by injection current with the EDFA that includes a semiconductor laser for outputting pumping light, a doped fiber doped with erbium or the like, and a coupler for coupling the pumping light to the doped fiber, the SOA is far economical from the viewpoint of the number of components. In particular, the SOA is more suitable for amplifying a single signal wavelength.

To amplify the WDM signal collectively using the fiber amplifier, it is essential to increase the power of the optical amplifier to compensate for the optical losses caused by optical components such as the wavelength multi-demultiplexer and optical intensity modulators. However, a broadband, high-power light amplifier covering the entire wavelength band of the multi-wavelength light is very expensive even if used alone. Accordingly, depending on the wavelength bandwidth and output required, a configuration that amplifies the wavelengths individually by the SOAs can sometimes implement the optical modulation circuit more cheaply than the configuration using the fiber amplifier.

In addition, the SOA has the following advantages.

The SOA is applicable as a modulator by varying the injection current in response to a modulation signal.

The SOA can be integrated with an electro absorption modulator (EA modulator) and the like.

Next, typical configuration examples of the optical modulation apparatus using the SOAs will be described.

CONVENTIONAL EXAMPLE 1

FIG. 3 shows as a conventional example 1 a configuration of a conventional optical modulation apparatus applicable to the optical intensity modulator 105 as shown in FIG. 1. The system of the conventional example 1 is drawn assuming that an SOA is used as a modulator 306, and an optical modulation apparatus 303 is placed at a distance from a light source. The SOA modulator 306 has its one end coupled to an input transmission path 301 to which an optical signal is input and other end coupled to an output transmission path 309 from which the optical signal is output. The input/output transmission paths, however, include optical connectors and splices in addition to a variety of optical devices such as an optical filter and optical coupler not shown. Furthermore, although omitted from this figure, a wavelength multi-demultiplexer is inserted between the input/output transmission path 301 and the SOA modulator 306. These components all constitute reflection points. Since the reflection points are present at both end sides of the SOA optical amplifying section 306, the reflection points and the SOA constitute an optical cavity, which can make the operation of the SOA unstable. To prevent the defect, optical isolators 305 and 307, which allow the light to be transmitted in one direction, are inserted into both sides of the SOA as shown in FIG. 3.

CONVENTIONAL EXAMPLE 2

FIG. 4 shows as a conventional example 2 a configuration of a conventional optical modulation apparatus applicable to the optical modulation circuit of FIG. 2. FIG. 4 shows configurations of two types of optical modulation apparatuses 405 and 407. A first type optical modulation apparatus 405 is configured such that a bidirectional optical amplifier 409 amplifies the optical power of a continuous wave demultiplexed by a wavelength multi-demultiplexer 403, and an optical intensity modulator 411 receiving the continuous wave carries out intensity modulation by a data signal to generate modulated light followed to be reflected by an optical reflector 413, and that the reflected light passes through the optical intensity modulator 411 and bidirectional optical amplifier 409 once again. A second type optical modulation apparatus 407 is configured such that a bidirectional optical amplifier 415 amplifies the optical power of the continuous wave demultiplexed by the wavelength multi-demultiplexer 403, an optical loop constructed by using an optical circulator 417 receives the continuous wave, and an optical intensity modulator 419 installed in the optical loop carries out the intensity modulation by the data signal to generate modulated light, and that the modulated light passes through the optical circulator 417 and the bidirectional optical amplifier 415 once again. In the former optical modulation apparatus 405, the optical reflector 413 can be a discrete component separated from the optical intensity modulator 411, or can be affixed to the end face of the optical intensity modulator 411 as an integrated combination thereof.

As the bidirectional amplifiers 409 and 415 used in the configuration of FIG. 4, an SOA is suitable because it is enough for these amplifiers to perform single wavelength amplification. Using the SOA as the bidirectional optical amplifiers 409 and 415, however, brings about signal degradation because of the gain scrambling between the continuous wave and modulated light in the saturation region of the gain. Specifically, the continuous wave is modulated by the signal pattern of the modulated light within the optical amplifiers 409 and 415.

Therefore it is preferable as illustrated in FIG. 5 that the bidirectional optical amplifiers 409 and 415 be used in an unsaturated region in which when the sum of the output powers (or of the input powers) of the continuous wave and modulated light from the bidirectional optical amplifiers 409 and 415 is less than certain output power (or input power), the gain is kept constant.

(Problems to be Solved)

The configuration of the conventional example 1 as shown in FIG. 3 has a remaining problem of the end face reflection of the SOA device itself even if the optical isolators 305 and 307 are inserted into both ends of the SOA 306. Generally, the SOA 306 has its end faces applied with antireflection coating to reduce the end face reflectance, and the end face reflectance is usually smaller than the reflectance of the transmission path reflection. However, when the SQA 306 has a large gain, the cavity effect of the optical modulation apparatus 303 increases, thereby making the amplifying operation unstable. In other words, the value of the end face reflectance imposes a limit on the gain permitted for the SOA. Accordingly, to achieve the high gain amplification by the SOA, it is necessary to connect SOAs in cascade as shown in FIG. 6, for example.

As a multi-stage configuration of the SOAs, a two-stage cascade configuration of SOA+EA modulators (which will be described later) is proposed (Relevant Reference 1: Ohman, F.; Bischoff, S.; Tromborg, B.; Mork, J.; "Noise properties and cascadability of SOA-EA regenerators", Lasers and Electro-Optics Society, 2002. LEOS 2002. The 15th Annual Meeting of the IEEE, Volume 2, 2002, Pages 895-896). To minimize the effect of the optical reflection in the multi-stage configuration of the SOAs, although it is possible to insert optical isolators into the input/output ends of all the multi-stage SOAs as shown in FIG. 6, it is not desirable from the viewpoint of cost. In addition, the Relevant Reference 1 describes nothing about the insertion of the optical isolators.

As for the configuration of the conventional example 2 as shown in FIG. 4, it has reflected light 1 and reflected light 2 at the ends of the bidirectional optical amplifiers (SOA) 409 and 415. Even though the end faces of bidirectional optical amplifiers 409 and 415 are made to have low reflectance by the antireflection coating, the reflected light is large because of the amplification of the power of the reflected light before and after the end face reflection. Thus, the reflected light interferes with signal light, and brings about noise. Incidentally, the reflected light 1 and reflected light 2 will be explained later in the description of FIG. 8.

DISCLOSURE OF THE INVENTION

The present invention is implemented to solve the foregoing problems. Therefore it is an object of the present invention to provide an economical optical modulation apparatus that can reduce the effect of the reflected light rays and achieve the stable amplifying function by the device specification design and device configuration considering the effect of the reflection passing through the optical amplifiers in the optical modulation apparatus with a configuration including optical amplifiers connected in a multi-stage fashion, or in the optical modulation apparatus including optical amplifiers as bidirectional optical amplifiers.

A first aspect of the present invention implements a stable amplifying function by reducing the effect of reflected light rays from end faces of a bidirectional optical amplifier by imposing a numerical limitation on the relationship between the gain of the bidirectional optical amplifier and the loss of the optical modulator in a reflection type optical modulator including the bidirectional optical amplifier, or in a multi-wavelength collective optical modulation apparatus combining the multiple optical modulators.

A second aspect of the present invention implements a stable amplifying function by reducing the effect of reflected light rays from end faces of a bidirectional optical amplifier by inserting a polarization rotation means into a reflection type optical modulator including the bidirectional optical amplifier, or into a multi-wavelength collective optical modulation apparatus combining the multiple optical modulators.

A third aspect of the present invention implements both stable amplifying function and cost reduction by reducing the effect of reflected light rays by interposing optical isolators at every alternate SOAs in a transmission-type optical modulation apparatus including semiconductor optical amplifiers (SOAs) connected in a multistage fashion.

BRIEF DESCRIPTION OF THE DRAWINGS

FIG. 10 is a table illustrating ratios of the reflected light rays to signal light in FIG. 9;

FIG. 16 is a block diagram showing a configuration of an optical modulation apparatus of a fifth embodiment in accordance with the present invention.

BEST MODE FOR CARRYING OUT THE INVENTION

The best mode for carrying out the invention will now be described with reference to the accompanying drawings.

First Embodiment

The first embodiment in accordance with the present invention has, in a transmission-type optical modulation apparatus including semiconductor optical amplifiers (SOAs) connected in cascade, optical isolators inserted at every alternate units to reduce the effect of the reflected light, thereby implementing the stable amplifying function and cost reduction at the same time. Before describing concrete configuration examples of the present embodiment, its principle will be explained.

<Reflected Light in Multistage Connection of SOAs>

Figure 7:
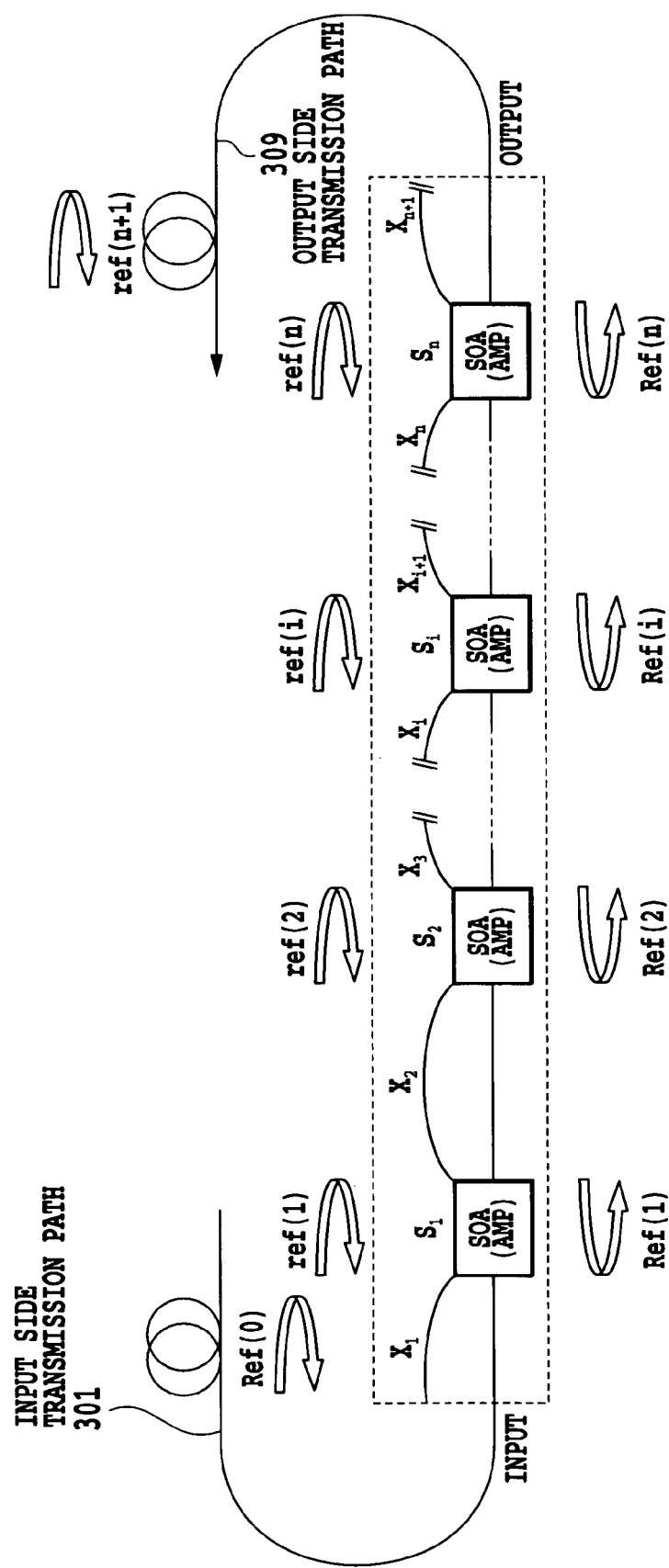
FIG. 7 is a schematic diagram illustrating behavior of reflected light rays in a multistage connection of a plurality of semiconductor optical amplifiers.

FIG. 7 is a diagram illustrating reflected light rays when a plurality of SOAs are arranged in the multistage connection. In the multistage connection, to operate it as an optical modulation apparatus, one of the SOAs must be used as an optical intensity modulator, or an external modulator must be inserted. However, to simplify the description of the reflected light rays here, the SOAs are assumed to function just as an optical amplifier.

In FIG. 7, n (>=2) semiconductor optical amplifiers ($S_1$, $S_2$, ..., $S_i$, ..., $S_n$) are coupled in series via n+1 optical paths ($x_1$, $x_2$, ..., $x_i$, ..., $x_{n+1}$) inclusive of input/output paths which are connected to an input-side transmission path 301 and an output-side transmission path 309, respectively. As described above, the input/output transmission paths 301 and 309 constitute a reflection point. In addition, since the SOAs ($S_1$, $S_2$, ..., $S_i$, ..., $S_n$) have reflection ends at both ends of the devices themselves, the SOAs become reflection points by themselves.

Figure 8:
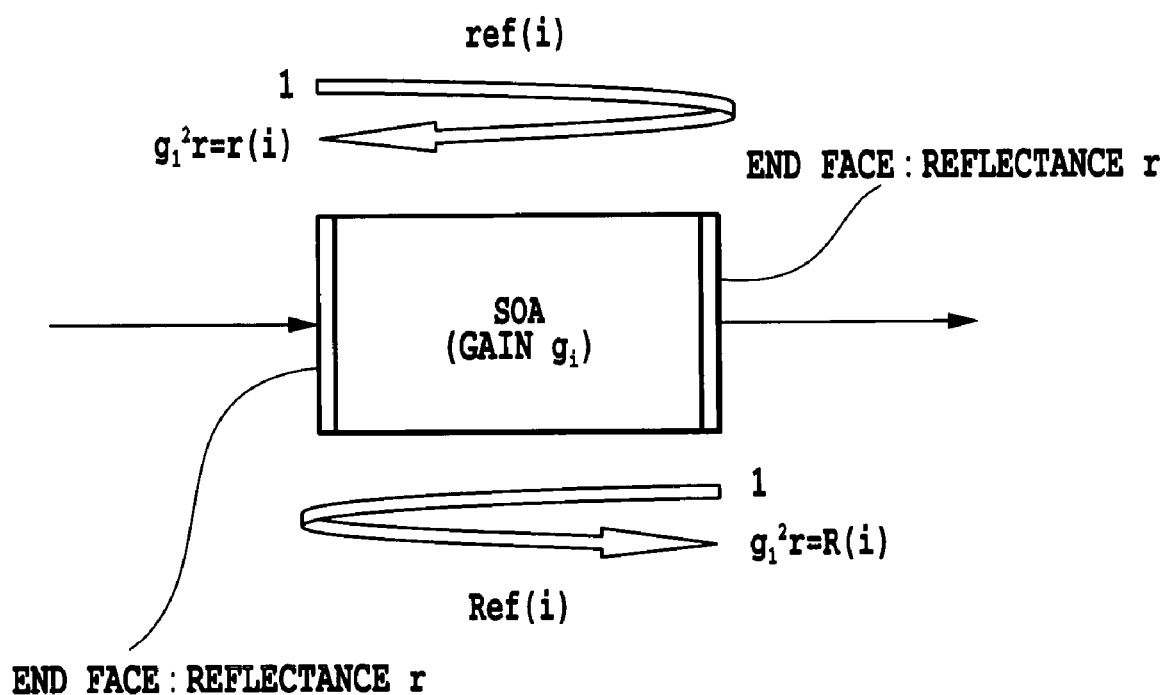
FIG. 8 is a schematic diagram illustrating reflected light rays of a semiconductor optical amplifier.

FIG. 8 is a diagram illustrating the reflected light rays of the SOA. Assume that the SOA has a gain $g_i$, and end face reflectance r, then, when light with optical power 1 is input to the SOA, the SOA has reflection optical power of $g_i^2 r$. This means that the end face reflectance is multiplied by $g_i^2$. The reflection can take place bidirectionally in every SOA.

In FIG. 7, the reflections in the traveling direction of the signal light are designated by Ref(0), Ref(1), ..., Ref(i), and Ref(n) in this order from the input side, and the reflections in the opposite direction of the signal light are designated by ref(1), ref(2), ..., ref(i), and ref(n+1) in this order from the input-side. The Ref(0) and ref(n+1) are input-side transmission path reflection and output-side transmission path reflection, respectively, and the remaining reflections Ref(i) and ref(i) represent bidirectional reflections of the semiconductor optical amplifier $S_i$.

Figure 9:
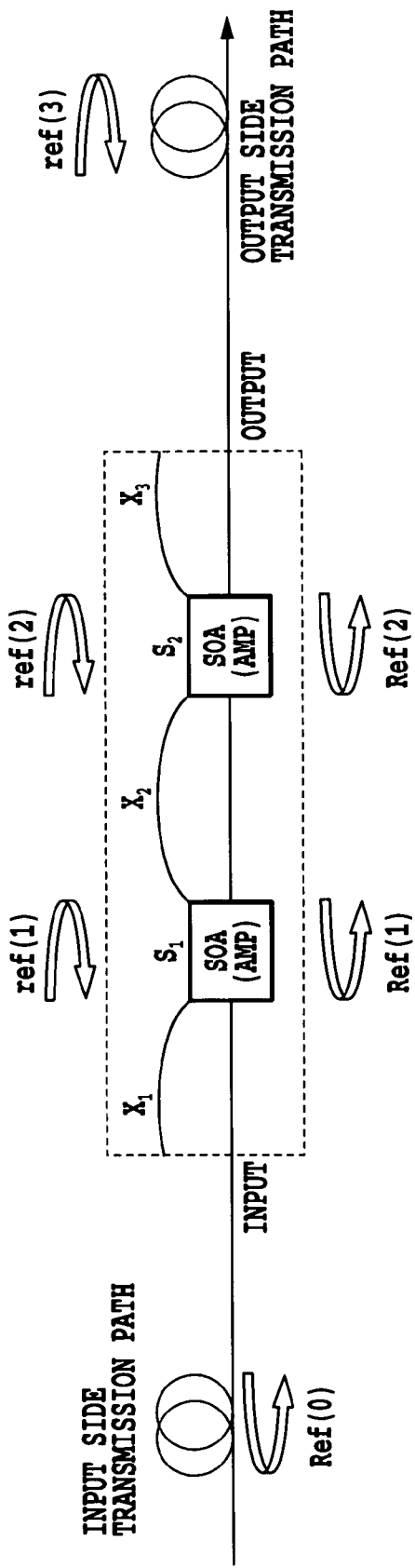
FIG. 9 is a schematic diagram illustrating the behavior of reflected light rays in a multistage connection of two semiconductor optical amplifiers.

The effect of the reflected light rays will be considered in the case of n=2 for simplicity. FIG. 9 is a diagram illustrating the reflected light rays when n=2. The symbols Ref(0), Ref(1) and Ref(2) designate the reflections in the traveling direction of the signal light, and the symbols ref(1), ref(2) and ref(3) designate the reflections in the opposite direction. The Ref(0) and ref(3) designate the input-side transmission path reflection and output-side transmission path reflection, respectively, and Ref(1) and ref(1), and Ref(2) and ref(2) are the reflections of the semiconductor optical amplifiers $S_1$ and $S_2$, respectively. The reflection becomes a problem because following the reflection (first reflection) in the direction opposite to the traveling direction of the signal light, the reflection (second reflection) in the traveling direction occurs, which will make the signal optical power unstable because of interference with the signal light. In FIG. 9, since the SOAs have a gain, the reflected light rays are amplified by that gain, which enhances the effect.

FIG. 10 is a table illustrating ratios of the twice reflected light rays to the signal light when the reflectances of the Ref(i) and ref(i) in FIG. 9 are assumed to be R(i) and r(i) (where $1<=i<=3$). As shown in FIG. 10, when Ref(i−1) reflection occurs following ref(i), the ratios of the twice reflected light rays to the signal light are in the order of a square of the reflectance at the reflection point. However, when the reflection Ref(i−2) or Ref(i−3) occurs following ref(i), the ratio of the twice reflected light rays to the signal light is increased by a square of the gain of the SOA passed through as compared with the order of the square of the reflectance at the reflection point. Although FIG. 10 shows the case where n=2, when n SOAs are arranged in the multistage connection, the reflections Ref(i−2), Ref(i−3), . . . , and Ref(0) following ref(i) have the ratios of the reflected light rays to the signal light greater than the reflection Ref(i−1) following ref(i) by squares of the gains of $S_{i-1}$, $S_{i-1}+S_{i-2}$, . . . , $S_{i-1}$, $S_{i-2}+$. . . $S_1$ (where $1<=i<=n+1$).

Accordingly, to allow the reflection Ref(i−1) following ref(i), and to prevent reflections Ref(i−2), Ref(i−3), . . . , and Ref(0) following ref(i), it is enough to insert optical isolators at every alternate optical path ($x_1$, $x_2$, . . . , $x_i$, . . . , $x_{n+1}$).

CONCRETE CONFIGURATION EXAMPLE

Figure 11A:
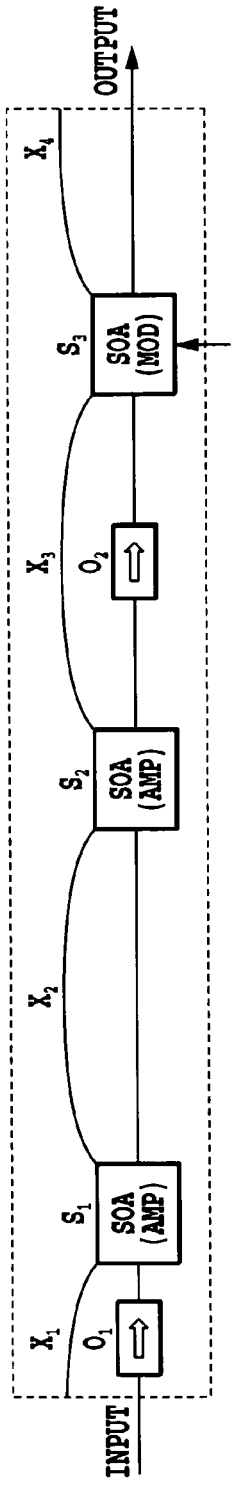
FIGS. 11A-11C are block diagrams each showing a configuration of an optical modulation apparatus of a first embodiment in accordance with the present invention.
Figure 11B:
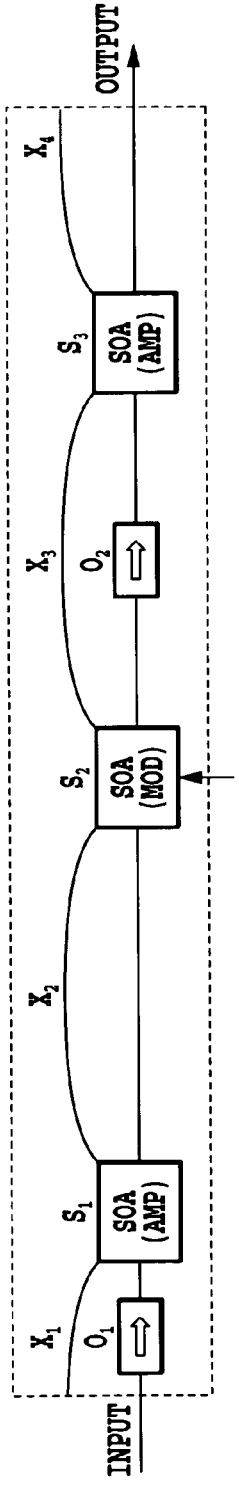
Figure 11C:
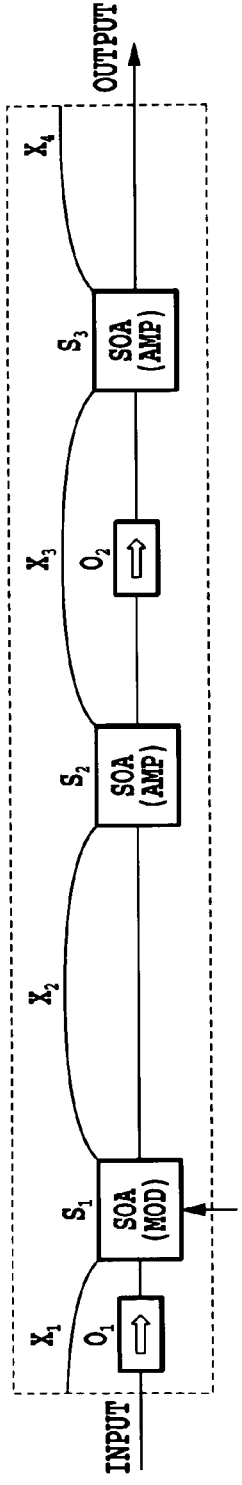

FIGS. 11A-11C are diagrams illustrating configurations of the optical modulation apparatus of the first embodiment in accordance with the present invention, into which optical isolators are inserted at every alternate optical path. Here, $O_1$ and $O_2$ each designate an optical isolator. The first optical isolator $O_1$ is inserted into the first optical path $x_1$ between the input-side transmission path and the first SOA $S_1$, and the second optical isolators $O_1$ is inserted into the third optical path $x_3$ between the second SOA $S_2$ and third SOA $S_3$. Thus, the present embodiment is characterized by inserting the optical isolators at every alternate optical path.

In addition, the present examples each include n=3 SOAs, and use any one of them as an optical intensity modulator (MOD) by carrying out intensity modulation of injection current by a transmission signal. Specifically, the third SOA $S_3$ is used as the optical intensity modulator in FIG. 11A, the second SOA $S_2$ is used as the optical intensity modulator in FIG. 11B, and the first SOA $S_1$ is used as the optical intensity modulator in FIG. 11C.

As for the foregoing relationship of the arrangement of the optical isolators and the optical intensity modulator, it is the same when the number of the SOAs is two or four or more.

The configuration of the embodiment can implement the system that can compensate for the optical power loss on the transmission path and achieve the modulation operation simultaneously in the optical communication system having the light source for outputting the continuous wave and the optical intensity modulator, which are placed at a distance via the transmission path.

Second Embodiment

Figure 12A:
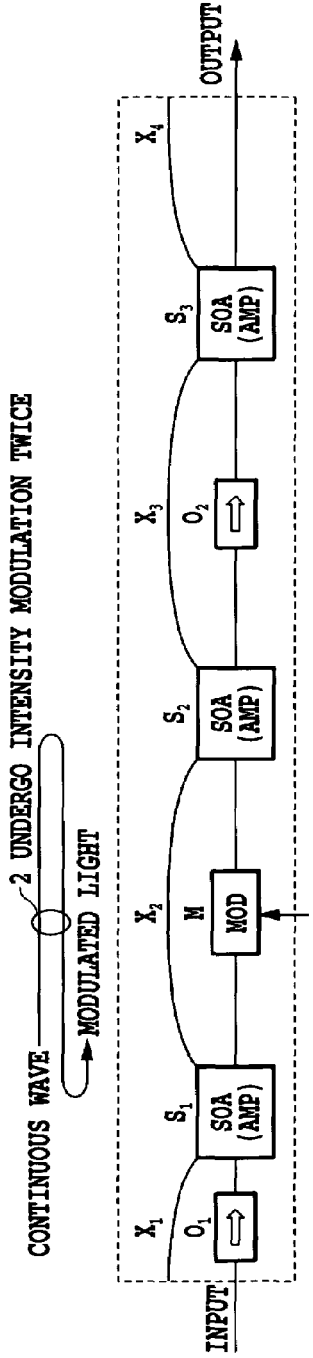
FIGS. 12A-12C are block diagrams each showing a configuration of an optical modulation apparatus of a second embodiment in accordance with the present invention.
Figure 12B:
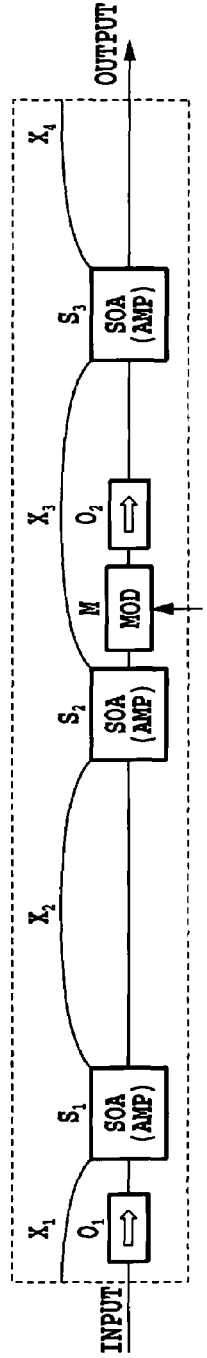
Figure 12C:
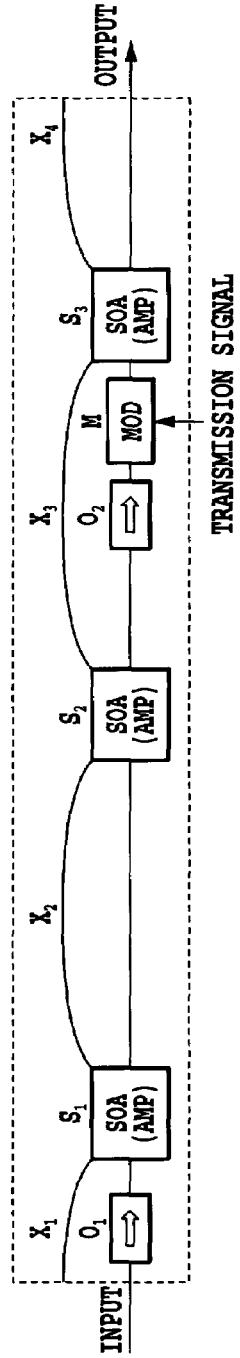

FIGS. 12A-12C are diagrams each showing a configuration of the optical modulation apparatus of a second embodiment in accordance with the present invention. The present embodiment is a variation of the first embodiment, which has an optical intensity modulator M inserted between any two of three SOAs $S_1$, S2 and $S_3$ constituting the optical amplifier.

FIG. 12A shows a configuration having the optical intensity modulator M inserted into a section in which neither the optical isolator $O_1$ nor $O_2$ is inserted. Although the example is shown here which has the optical intensity modulator M inserted into the second optical path (optical connection means) $x_2$ between the first and second SOAs $S_1$ and $S_2$, the optical intensity modulator M can be inserted into a fourth optical path $x_4$ between the third SOA $S_3$ and the output terminal. In the latter case, however, it is necessary to use an optical intensity modulator M that can handle the optical power amplified by the final stage SOA $S_3$.

In the configuration of FIG. 12A, the intensity modulation is carried out twice by the optical intensity modulator M until the continuous wave output from the first SOA $S_1$ interferes with the twice reflected light ray of the continuous wave at the second SOA $S_2$ and first SOA $S_1$. Accordingly, the ratio of the twice reflected light ray to the signal light is relatively small as comprised with the case where no optical intensity modulator M is inserted.

FIG. 12B shows a configuration that has the optical intensity modulator M inserted into the section into which the optical isolator $O_2$ is inserted. Although the example shown has the optical intensity modulator M inserted into the third optical path $x_3$ between the second and third SOA $S_2$ and $S_3$, the optical intensity modulator M can be inserted into the first optical path $x_1$ between the input terminal and the first SOA $S_1$. In the latter case, however, it is necessary to consider that the input power to the SOA $S_1$ is reduced and the SNR is deteriorated because of the loss of the optical intensity modulator M. Incidentally, the order of connection of the optical isolator $O_2$ and the optical intensity modulator M is arbitrary as shown in FIGS. 12B-12C.

As the optical intensity modulator M used in the present embodiment, an electro absorption optical intensity modulator (EA modulator) can be used, for example. Since the foregoing first embodiment uses the SOA as the optical intensity modulator, it is difficult to carry out the modulation operation of the order of G (bps) or more. In contrast, the EA modulator used as the optical intensity modulator can handle the modulation operation of the order of 40G (bps).

Third Embodiment

Figure 1:
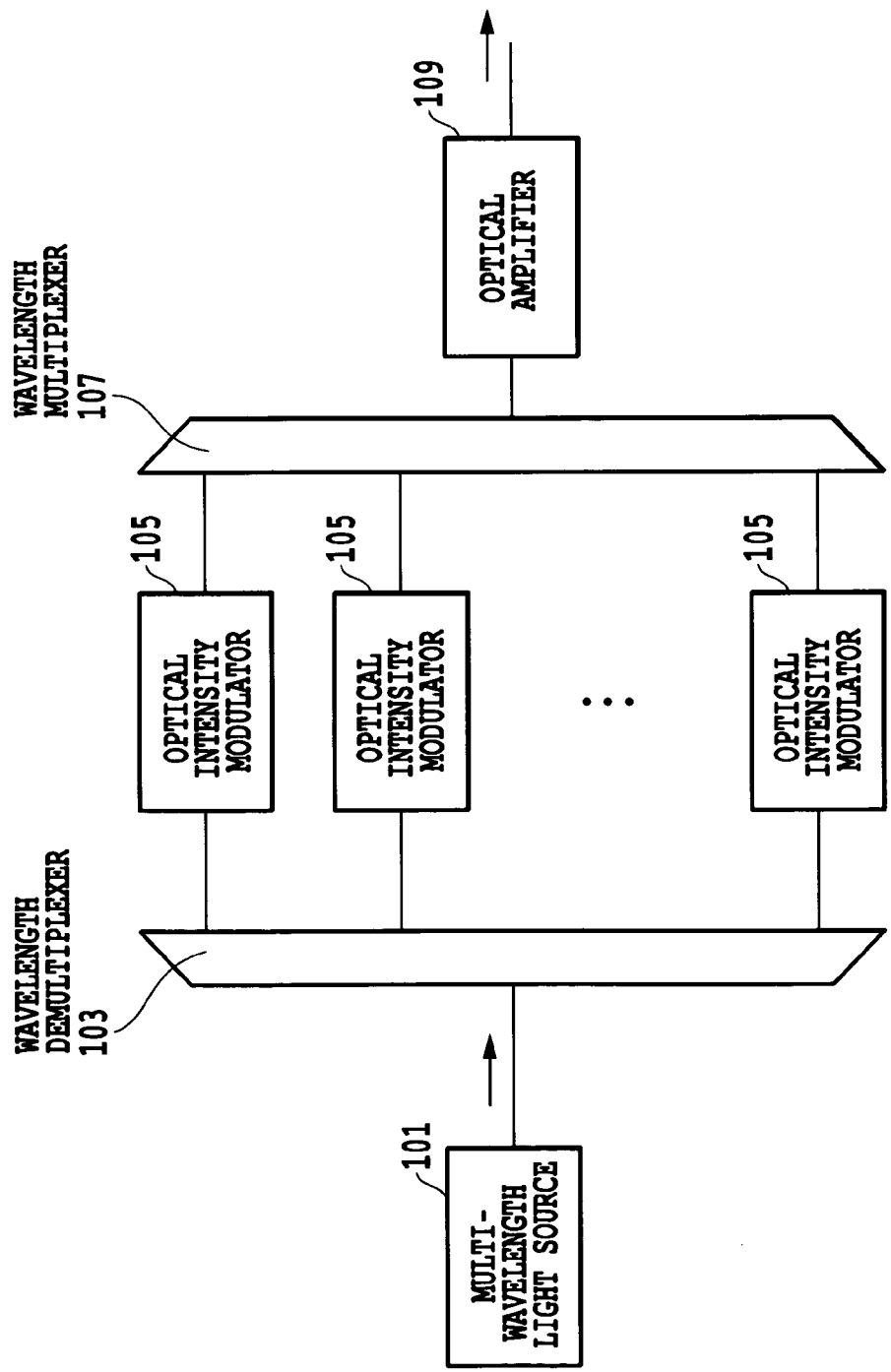
FIG. 1 is a block diagram showing a configuration of a conventional optical modulation circuit.
Figure 2:
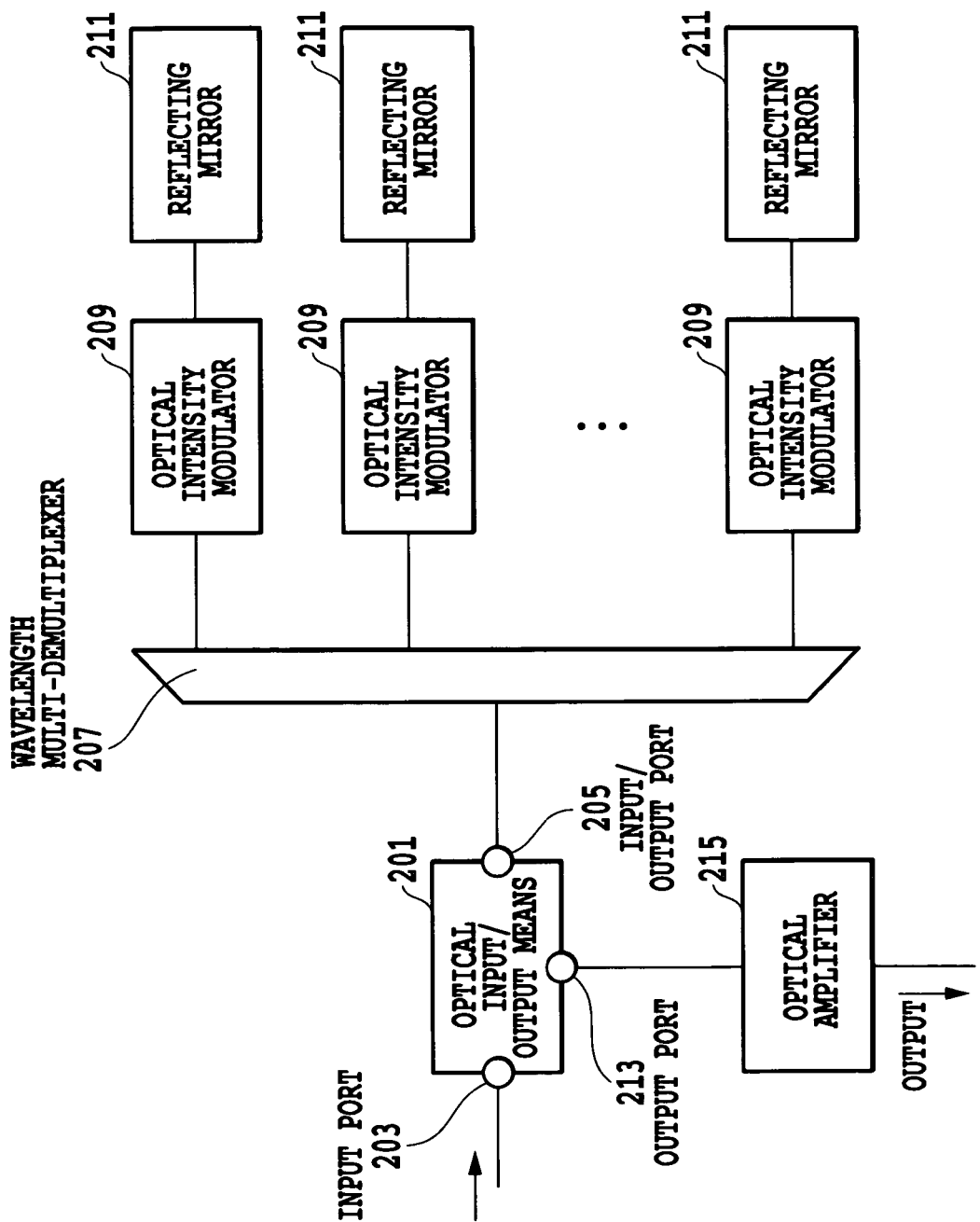
FIG. 2 is a block diagram showing a configuration of a conventional reflection type optical modulation apparatus.
Figure 3:
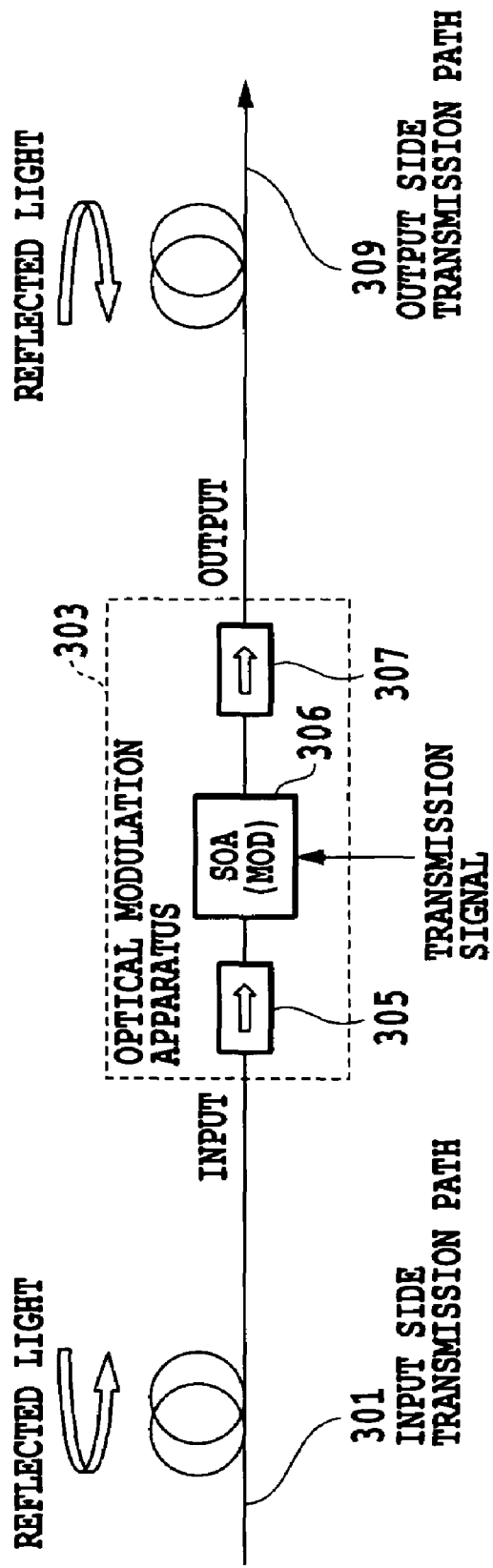
FIG. 3 is a block diagram showing a configuration of a conventional optical modulation apparatus utilizing a semiconductor optical amplifier.
Figure 4:
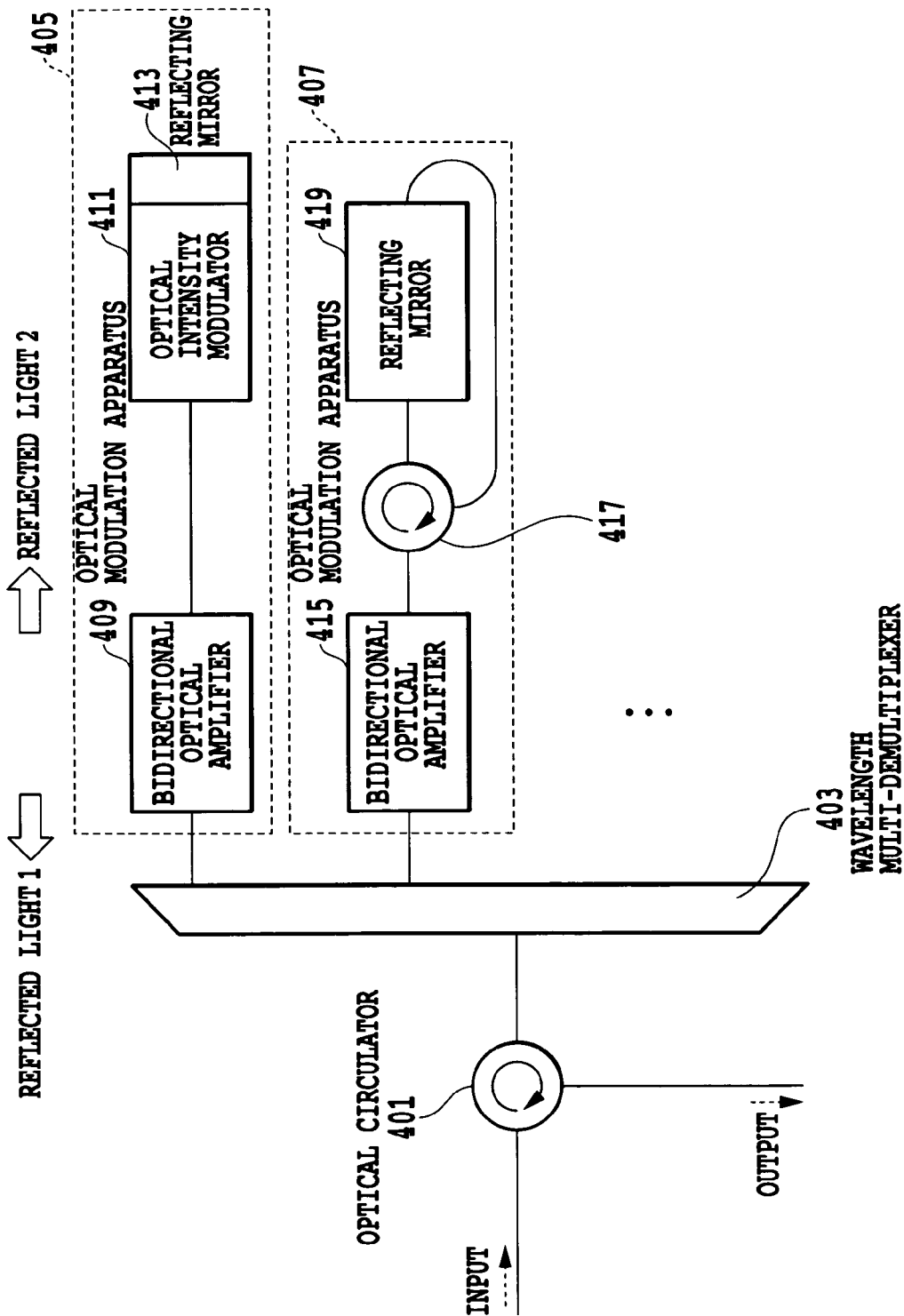
FIG. 4 is a block diagram showing a configuration of a conventional optical modulation apparatus utilizing bidirectional optical amplifiers.

A third embodiment of the optical modulation apparatus in accordance with the present invention relates to a system that can achieve the stable amplifying function by reducing the effect of the reflected light rays on the end faces of the bidirectional optical amplifiers by imposing the following numerical limitation on the gain of the amplifier in the foregoing system configuration including the bidirectional optical amplifiers as shown in FIG. 4. The numerical limitation on the amplifier gain in accordance with the present invention will be described below.

<Method of Quantifying Effect of Reflected Light>

As shown in FIG. 4, there are two reflected light rays from the ends of the bidirectional optical amplifier 409 or 415: first reflected light 1 travels in the same direction as the modulated light, and second reflected light 2 travels in the same direction as the continuous wave. The continuous wave undergoes the intensity modulation and becomes the modulated light. Since the reflected light 2 travels through the same path as the continuous wave, the modulated light is finally provided with the reflected light 1 and reflected light 2. The modulated light interferes with the same polarization direction components of the reflected light 1 and reflected light 2, thereby generating intensity fluctuations as beat noise. Next, a method will be described of quantitatively showing the effect of the reflected light 1 and reflected light 2 on the modulated light.

The following are assumed here.

The multiple reflection light rays, which are reflected off the first end face of the bidirectional optical amplifier 409 or 415 and then reflected off the second end face thereof again, are assumed to be sufficiently small and are neglected.

The mark-to-space ratio of the transmission signal is assumed to be 1/2. (Since the continuous mark or space in the data signal train makes it difficult to extract a clock signal at the reception of the signal, a technique of making the mark-to-space ratio nearly 1/2 is usually employed such as scramble in the SDH (synchronous digital hierarchy) or 8 B→10 B (bel) conversion in the gigabit ether.)

Assume that the input continuous wave power to the bidirectional optical amplifiers 409 and 415, the gain of the bidirectional optical amplifiers 409 and 415, the difference between the modulated light output power and the input continuous wave power to the optical intensity modulators 411 and 419, and the reflectance of the entire bidirectional optical amplifier are 1, g, x and r', respectively, then the modulation optical power of the optical modulator output, the power of the reflected light 1, and the power of the reflected light 2 are represented by $g^2x$, r' and $g^2x^2r'$, respectively.

Since the problem to be considered here is the interference between the modulated light and the reflected light, it is enough to consider only the effect of the reflected light when the modulated light is at the mark. Since the transmission signal has the mark-to-space ratio of 1/2, the mark level power of the output modulated light of the optical modulator, and the mark level power of the reflected light 2 are $2g^2x$ and $4g^2x^2r'$, respectively. Here, since the probability is 1/2 that the modulated light and reflected light 2 are mark at the same time in the optical modulator output, the effect of the reflected light 2 is halved. Accordingly, the power ratio between the modulated light and the total reflected light when the modulated light is at the mark is expressed by $$\frac{S}{N} = \frac{2g^2x}{(r' + 2g^2x^2r')} \quad (1)$$

In addition, since r' has a relationship of $r'=g^2r$ when the fiber coupling loss is neglected, it can be rewritten as $$\frac{S}{N} = \frac{2g^2x}{(g^2r + 2g^4x^2r)} \quad (2)$$

Considering expression (2) as a function of x, expression (2) takes a maximum value when $$x = \frac{1}{\sqrt{2}g} \quad (3)$$

In other words, the effect of the reflected light rays can be minimized at that value. Rewriting it using a logarithmic scale and the transmission path loss L[dB] and bidirectional amplifier gain G[dB], the following expression holds.

$$L = -10\log_{10}(x) = 10\log_{10}(g) + \frac{1}{2} \cdot 10\log_{10}(2) = G + 1.5 \quad (4)$$

In this case, the power of the reflected light 1 becomes equal to that of the reflected light 2.

In actuality, since the reflected light interferes with the modulated light, the foregoing description is effective only for deriving expression (4) above that optimizes the SNR. The quantitative estimation of the effect of the reflected light on the modulated light can be made as follows.

Consider the case where the optical modulator output is received through the optical circulator 417 or the like. Assume that mark-side optical electrical field of the modulated light is $E_0 \exp[i(\omega_c t+\phi_0)]$, mark-side optical electrical field of the reflected light 1 is $E_1 \exp[i(\omega_c t+\phi_1)]$, and mark-side optical electrical field of the reflected light 2 is $E_2 \exp[i(\omega_c t+\phi_2)]$, then the optical electrical field before reception is expressed by the following expression.

$$E_{OUT}(t) = E_0 \exp[i(\omega_c t+\phi_0)] + E_1 \exp[i(\omega_c t+\phi_1)] + E_2 \exp[i(\omega_c t+\phi_2)] \quad (5)$$

The received optical current is given by the following expression by neglecting all the coefficients required.

$$i_p = E_0^2 + 2E_0E_1\exp[i(\phi_0 - \phi_1)] + 2E_0E_2\exp[i(\phi_0 - \phi_2)] + E_1^2 + E_2^2 + 2E_1E_2\exp[i(\phi_1 - \phi_2)] \quad (6)$$

Here, the first term is the modulated light itself, and the second and subsequent terms are noise. The first term to sixth term represent when the modulated light and reflected light are all on the mark-side: the modulation optical power; the beat (interference) between the modulated light and the reflected light 1; the beat (interference) between the modulated light and the reflected light 2; the power of the reflected light 1; the power of the reflected light 2; and the beat (interference) between the reflected light 1 and the reflected light 2. The fourth to sixth terms are negligible because the reflected light is small as compared with the modulated light. Here, considering the second and third terms, normalized beat noise power is defined as follows.

$$\sigma_{RIN}^2 = \frac{2(E_0^2E_1^2 + E_0^2E_2^2)}{(E_0^2)^2} \quad (7)$$

The beat noise when a plurality of reflection points are involved can be handled as Gaussian distribution with a variance given by expression (7). On the contrary, when the number of the reflection points is small, excessive estimation of the beat noise is made.

The above discussion so far considers as the reflected light rays the reflected light 1 and reflected light 2 from both end faces of the bidirectional optical amplifiers 409 and 415. In practice, however, besides the end face reflections at the bidirectional optical amplifiers 409 and 415, there are input/output terminal reflections of a variety of optical devices inserted into the system, and reflections by optical connectors, and the reflected light rays from these reflection points undergo the gains of the bidirectional optical amplifiers 409 and 415, and become nonnegligible depending on their reflectances. In such a case, considering the end face reflectance r used in the discussion up to now as the sum of the reflectances of the reflection points other than the end face reflection, it can be correctly said that the estimation of the effect of the reflected light rays using the variance given by expression (7) is appropriate. On the other hand, when the reflections from both end faces of the bidirectional optical amplifiers 409 and 415 are dominant, it is appropriate to consider the foregoing estimation as the worst case.

The foregoing discussion is made on the analogy of the paper IEEE J. Lightwave Tchnol., vol. 14, no. 6, pp. 1097-1105, 1996 describing a method of quantitatively estimating the effect of the coherent crosstalk of an arrayed-waveguide grating (AWG). However, in the present optical modulation apparatus, since the probability that the reflected light 2 is mark when the modulated light is mark is 1/2, the foregoing expression (7) can be rewritten by the following expression.

$$\sigma_{RIN}^2 = \frac{2E_0^2 E_1^2 + E_0^2 E_2^2}{(E_0^2)^2} \quad (8)$$

The value of the expression is equal to twice the reciprocal of the foregoing expression (2).

<Calculation Example of Effect of Reflected Light>

Figure 13:
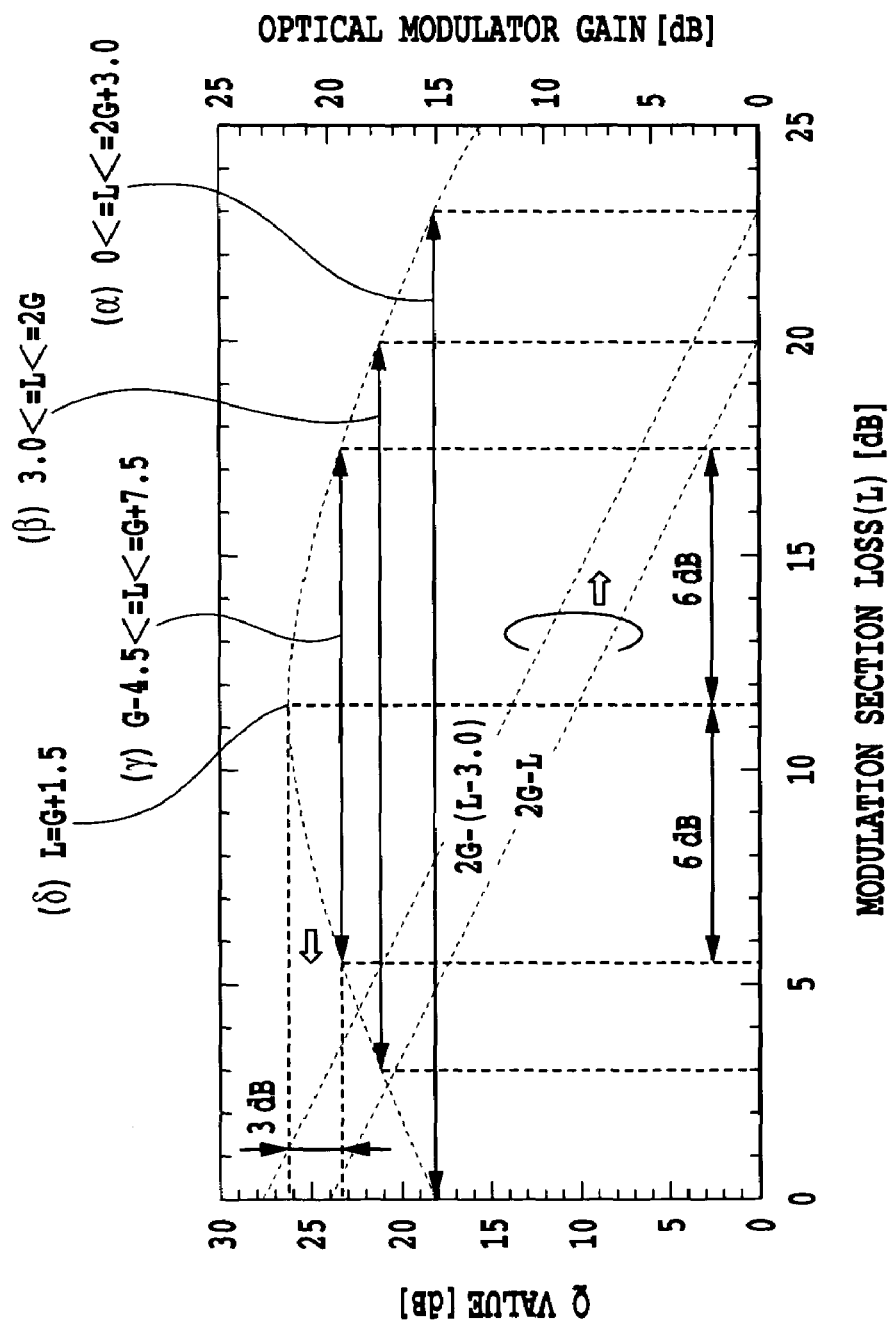
FIG. 13 is a graph illustrating characteristics of an optical modulation apparatus of a third embodiment in accordance with the present invention.

FIG. 13 shows calculation results using the foregoing expression (8). In FIG. 13, the horizontal axis represents a modulation section loss (L) [dB], and the vertical axis represents a Q value [dB] on the left side, and the optical modulation apparatus gain [dB] on the right side. As for the optical modulation apparatus gain, are drawn both 2G−(L−3.0) [dB] without considering the 3 dB modulation loss in the modulation section (optical intensity modulators) 411 or 419, and 2G−L [dB] considering the 3 dB modulation loss. The Q value here refers to an evaluation parameter that determines the signal-to-noise ratio (SNR) of the modulated light proposed in IEEE Photon. Technol. Lett. Vol. 5, no. 3, pp. 304-306, and is defined by the following expression $$Q = \frac{S(1) - S(0)}{\sigma_1 + \sigma_0} \quad (9)$$

where S(1) and S(0) indicate the signal levels of the mark and space, respectively, and $\sigma_1$ and $\sigma_0$ represent noise quantities of mark and space, respectively. Here, assume that S(1)=1, then $\sigma_1 = \sigma_{RIN}$, and S(0) and $\sigma_0$ are considered nearly zero.

It is assumed in the calculation that the input continuous wave power to the optical modulation apparatuses 405 and 407 is −6 dBm, the bidirectional optical amplifier gain G is 10 [dB], the bidirectional optical amplifier noise factor is 7 dB, and the total reflectance of the bidirectional optical amplifier is −22 dB, and that the modulated light is received by direct photoelectric conversion rather than by optical preamplifier reception. As shown in FIG. 13, which illustrates the calculation results, the Q value takes a maximum value when the modulation section loss L=11.5 [dB], that is, when L=G+1.5 [dB], and the curve representing the Q value has left-right symmetry with respect to the center having that value. In FIG. 13, ranges (α), (β), (γ) and (δ) are as follows.

(α) 0<=L<=2G+3.0

The optical modulation section loss region that ensures the optical modulator gain 2G−(L−3.0)>=0, and the Q value with the optical modulator gain 2G−(L−3.0)=0 (dB).

(β) 3.0<=L<=2G

The optical modulation section loss region that ensures the optical modulator gain 2G−L>=0, and the Q value with the optical modulator gain 2G−L=0 (dB).

(γ) G−4.5<=L<=G+7.5

The region where the Q value is within 3 dB of the maximum value.

(δ) L=G+1.5

The modulation section loss that takes the maximum Q value.

As for the region (δ), it is as described above. In addition, the upper limit values of L in the regions (α) and (β) indicate that the optical modulation gain is equal to or greater than 0 [dB]. Furthermore, as for the modulation section loss L, its value is logically determined from the fact that the Q value curve has the left-right symmetry as described above.

The Q value becomes within 3 dB with respect to the maximum value when 5.5 [dB]<=L<=17.5 [dB], that is, (G+1.5)−6 [dB]<=L<=(G+1.5)+6 [dB]. The range of L is independent of the value G. In fact, solving the quadratic equation for x, which is obtained by substituting the value x defined in the foregoing expression (3) into the foregoing expression (1), and by making the half of that result (3 dB reduction) equal to expression (1), gives the following solution.

$$x = \frac{(2\sqrt{2} \pm \sqrt{6})}{2g} \quad (10)$$

In addition, rewriting it in the logarithmic scale gives the following.

$$L = -10\log_{10}(x) \quad (11)$$
$$= 10\log_{10}\left(\frac{2}{2\sqrt{2} \pm \sqrt{6}}\right) + 10\log_{10}(g)$$
$$\cong (G + 1.5) \pm 6$$

It indicates the upper limit value and lower limit value of the region (γ).

Accordingly, with maintaining the gain, the optical modulation apparatus can keep the ratio low of the reflected light to the modulated light with placing the modulation section loss L in a given range in the region (α) (such as (β), (γ) and (δ)). In this case, as is clear from FIG. 13, the ratio can be reduced as the modulation section loss L approaches L=G+1.5 at (δ).

Fourth Embodiment

Figure 14:
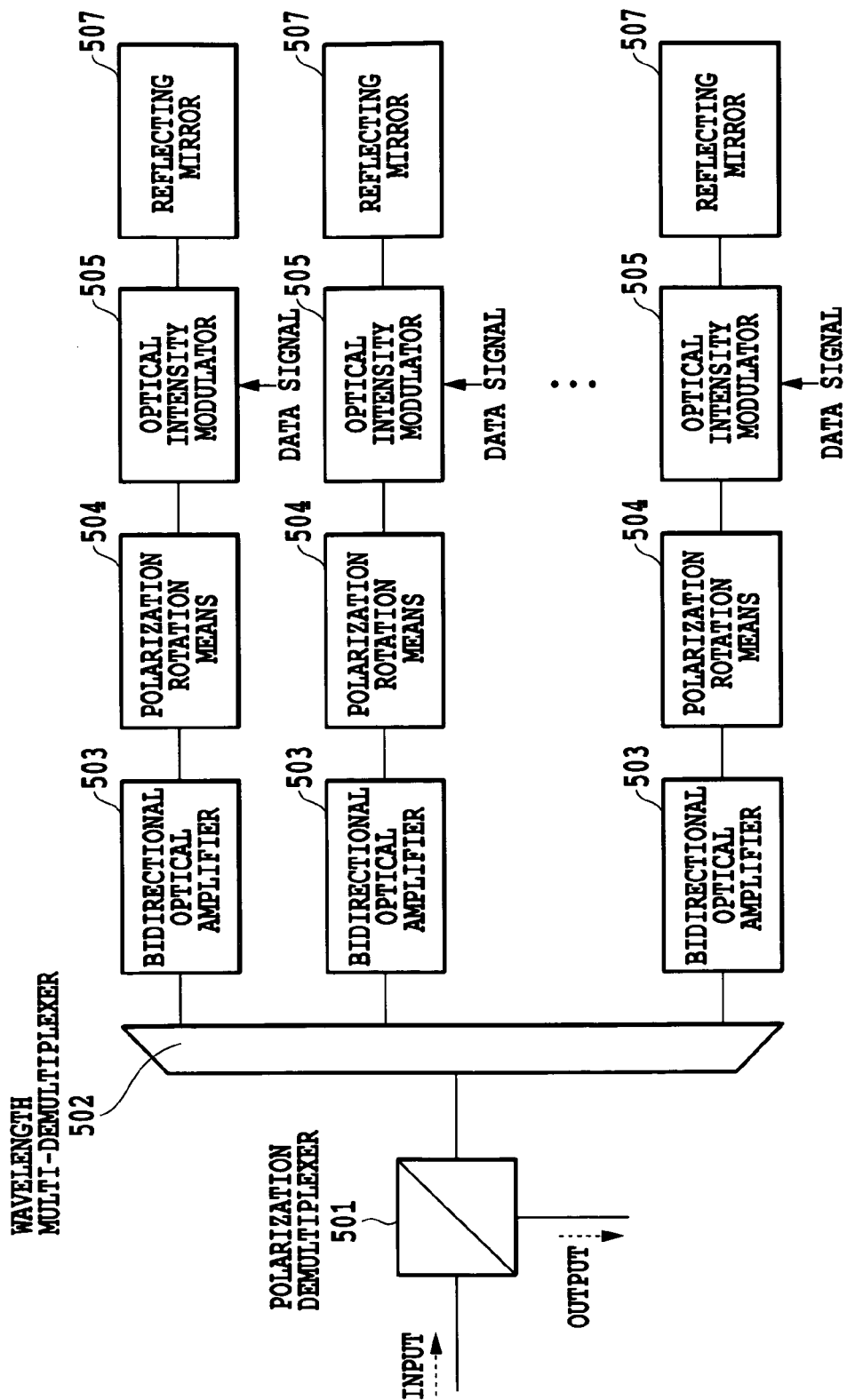
FIG. 14 is a block diagram showing a configuration of an optical modulation apparatus of a fourth embodiment in accordance with the present invention.

FIG. 14 shows a configuration of the optical modulation apparatus of a fourth embodiment in accordance with the present invention. The optical modulation apparatus of the present embodiment implements a stable amplifying function by reducing the effect of the reflected light from the end faces of the bidirectional optical amplifiers by inserting polarization rotation means.

As shown in FIG. 14, the present system is a multi-wavelength collective optical modulation apparatus that includes a polarization demultiplexer 501 for separating the input multi-wavelength light from the output modulated light by the difference in the plane of polarization; a wavelength multi-demultiplexer 502 for demultiplexing the multi-wavelength light into every predetermined wavelengths; bidirectional optical amplifiers 503 for bidirectionally amplifying the individual single wavelength optical powers demultiplexed; polarization rotation means 504 each for bidirectionally rotating the plane of polarization of the single wavelength light; optical intensity modulators 505 each for bidirectionally modulating the intensity of the single wavelength light; and optical reflectors 506 for feeding the modulated single wavelength light rays output from the optical intensity modulators 505 back to the bidirectional optical amplifiers 503.

As the polarization demultiplexer 501, a polarization beam splitter (PBS) is applicable. Alternatively, a configuration is also possible which has the wavelength multi-demultiplexer 502 produce output light via an optical circulator or an optical coupler, and extracts the light whose polarization shifts from that of the input light by 90 degrees by using a polarizer.

As the wavelength multi-demultiplexer 502, an AWG is applicable, for example. The AWG has the light incident onto an input waveguide output from a different output waveguide in accordance with the wavelength. The AWG has reversibility, and can multiplex a plurality of wavelength light rays into a single output waveguide.

As the bidirectional optical amplifiers 503, SOAs can be used, for example. The SOA is an optical amplifier for amplifying the light traveling through the active layer in the semiconductor by stimulated emission by reducing the reflection from the cavity end faces of a semiconductor laser. As the bidirectional optical amplifiers 503, fiber amplifiers such as erbium doped fiber amplifiers (EDFAs) can also be used. However, since the fiber amplifier is composed of a semiconductor laser for outputting pumping light, a doped fiber doped with erbium and the like, and a coupler for coupling the pumping light to the doped fiber, it will be more expensive than the SOA from the viewpoint of the number of the components. Accordingly, the SOA has a cost advantage.

The polarization rotation means 504 is installed between the bidirectional optical amplifiers 503 and the optical intensity modulators 505. As the polarization rotation means 504, a quarter-wave plate or a Faraday cell is applicable. Alternatively, a Faraday mirror is usable which attaches a reflecting mirror to an output end of the Faraday cell.

As the optical intensity modulators 505, a Mach Zehnder type optical intensity modulator or an electro absorption optical intensity modulator (EA modulator) is applicable, for example. They have a function of carrying out intensity modulation of the single wavelength light by a data signal. These optical intensity modulators can achieve the intensity modulation by a 40 G(bps) order modulation signal at a practical level.

As the optical reflectors 507, a mirror having metal coating or dielectric multi-layer coating is applicable, for example. As a reflecting mirror for a particular wavelength, a diffraction grating or fiber Bragg grating is also applicable to the optical reflector. In addition, as an application of the fiber Bragg grating, an optical reflector can be used in which a diffraction grating is directly written on an optical waveguide.

One of the output ports of the polarization demultiplexer 501 is optically connected to the input waveguide of the wavelength multi-demultiplexer 502 via a spatial optical system or an optical waveguide. The output waveguides of the wavelength multi-demultiplexer 502 are optically connected to first ports of the bidirectional optical amplifiers 503 via a spatial optical system or optical waveguides. Second ports of the bidirectional optical amplifiers 503 are optically connected to first ports of the polarization rotation means 504 via a spatial optical system or optical waveguides as well. Second ports of the polarization rotation means 504 are optically connected to first ports of the optical intensity modulators 505 via a spatial optical system or optical waveguides as well. Second ports of the optical intensity modulators 505 are optically connected to the optical reflectors 507 via a spatial optical system or optical waveguides as well.

In the present embodiment, the polarization demultiplexer 501 separates the inputs to the optical intensity modulators 505 from their modulated light outputs. However, in the case where the quarter-wave plates are used as the polarization rotation means 504, the angles of the planes of polarization of the input light rays and the output light rays differ by 90 degrees. Accordingly, the input light rays can be separated from the output light rays by extracting the particular polarized waves from the output light rays by the polarization demultiplexer 501.

The multi-wavelength light input to the wavelength multi-demultiplexer 502 via the input waveguide is demultiplexed to the individual wavelengths by the wavelength multi-demultiplexer 502. Each single wavelength light passing through the demultiplexing is led to corresponding one of the bidirectional optical amplifiers 503 to have its power amplified.

Figure 5:
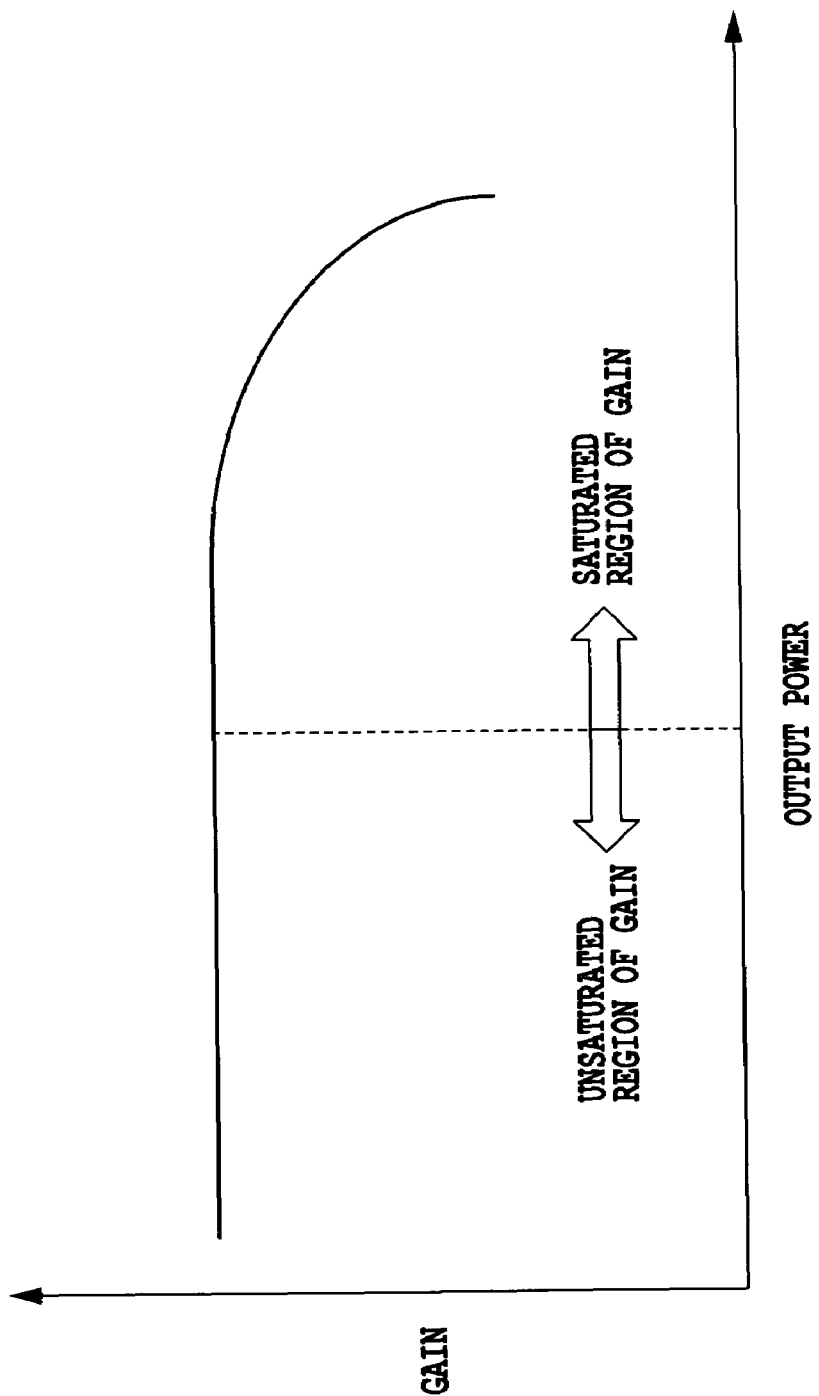
FIG. 5 is a graph illustrating an unsaturated region of a semiconductor optical amplifier.
Figure 6:
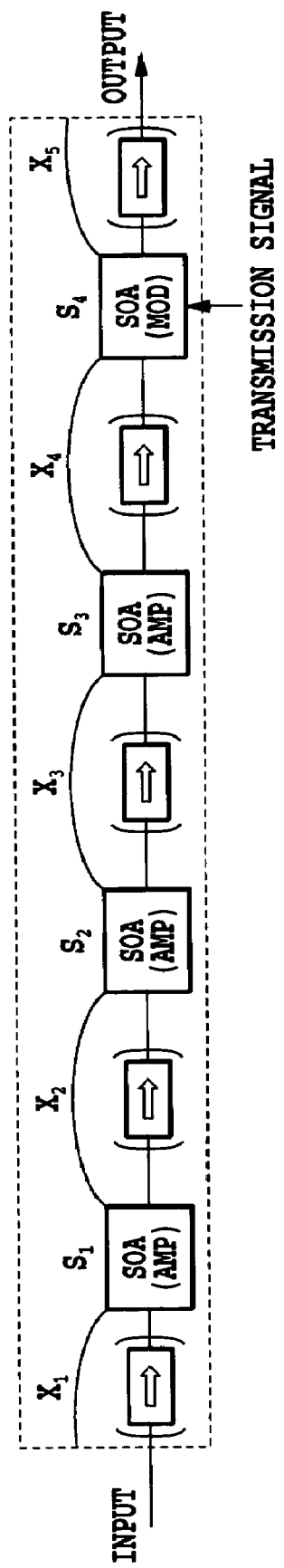
FIG. 6 is a block diagram showing a configuration conceivable as an optical modulation apparatus that can achieve high gain amplification by multistage connection of semiconductor optical amplifiers.

The bidirectional optical amplifiers 503 bring about signal degradation because of the gain scrambling between the continuous waves and modulated light rays in the saturation region of the gain. Accordingly, as illustrated in FIG. 5, it is preferable that the bidirectional optical amplifiers 503 be used in the unsaturated region of the gain in which the gain (the vertical axis) is maintained at a constant value as long as the sum of the output powers (the horizontal axis) (or the sum of input powers) of the continuous waves and the modulated light from the bidirectional optical amplifiers 503 is equal to or less than a particular output power (or input power).

The continuous waves (single wavelength light rays) whose powers are amplified by the individual bidirectional optical amplifiers 503 are input to the corresponding polarization rotation means 504. The polarization rotation means 504 rotate the planes of polarization of the continuous waves by 45 degrees, and supply them to the optical intensity modulators 505. The optical intensity modulators 505 carry out the intensity modulation of the continuous waves by modulation signals (data signals). The modulated single wavelength light rays are output from the optical reflectors side ports of the optical intensity modulators 505, and are input to the optical reflectors 507. The modulated light rays reflected by the optical reflectors 507 pass through the optical intensity modulators 505 again, and are input to the polarization rotation means 504. The modulated light rays have their planes of polarization rotated by 45 degrees by the polarization rotation means 504, and are input to the bidirectional optical amplifiers 503 which amplify the optical powers again. Since the output modulated light rays of the bidirectional optical amplifiers 503 have the planes of polarization different by 90 degrees from those of the input light rays, the polarization demultiplexer 501 can separate the output light rays from the input light rays. Accordingly, the output modulated light rays from the bidirectional optical amplifiers 503 are multiplexed by the wavelength multi-demultiplexer 502, and are output from the output port of the polarization demultiplexer 501 to a system outside.

To operate the optical amplifier in the bidirectional mode, the optical amplifier cannot include an optical isolator. Accordingly, it is necessary to consider the effect of the end face reflections from both terminals of the optical amplifying paths. As shown in FIG. 4, there are two reflected light rays in the bidirectional transmission (reflected light ray 1 and reflected light ray 2). The reflected light ray 1 propagates in the same direction as the modulated light, and the reflected light ray 2 in the same direction as the continuous waves. The continuous waves undergo the intensity modulation and become modulated light, and the reflected light ray 2 travels through the same path as the continuous waves. Consequently, if the planes of polarization of the reflected light rays 1 and 2, continuous waves, and modulated light rays are the same as in the conventional example, the modulated light rays are provided with the reflected light ray 1 and reflected light ray 2. As a result, the modulated light rays interfere with the same polarization direction components of the reflected light ray 1 and reflected light ray 2, causing the intensity fluctuations as the beat noise.

Figure 15:
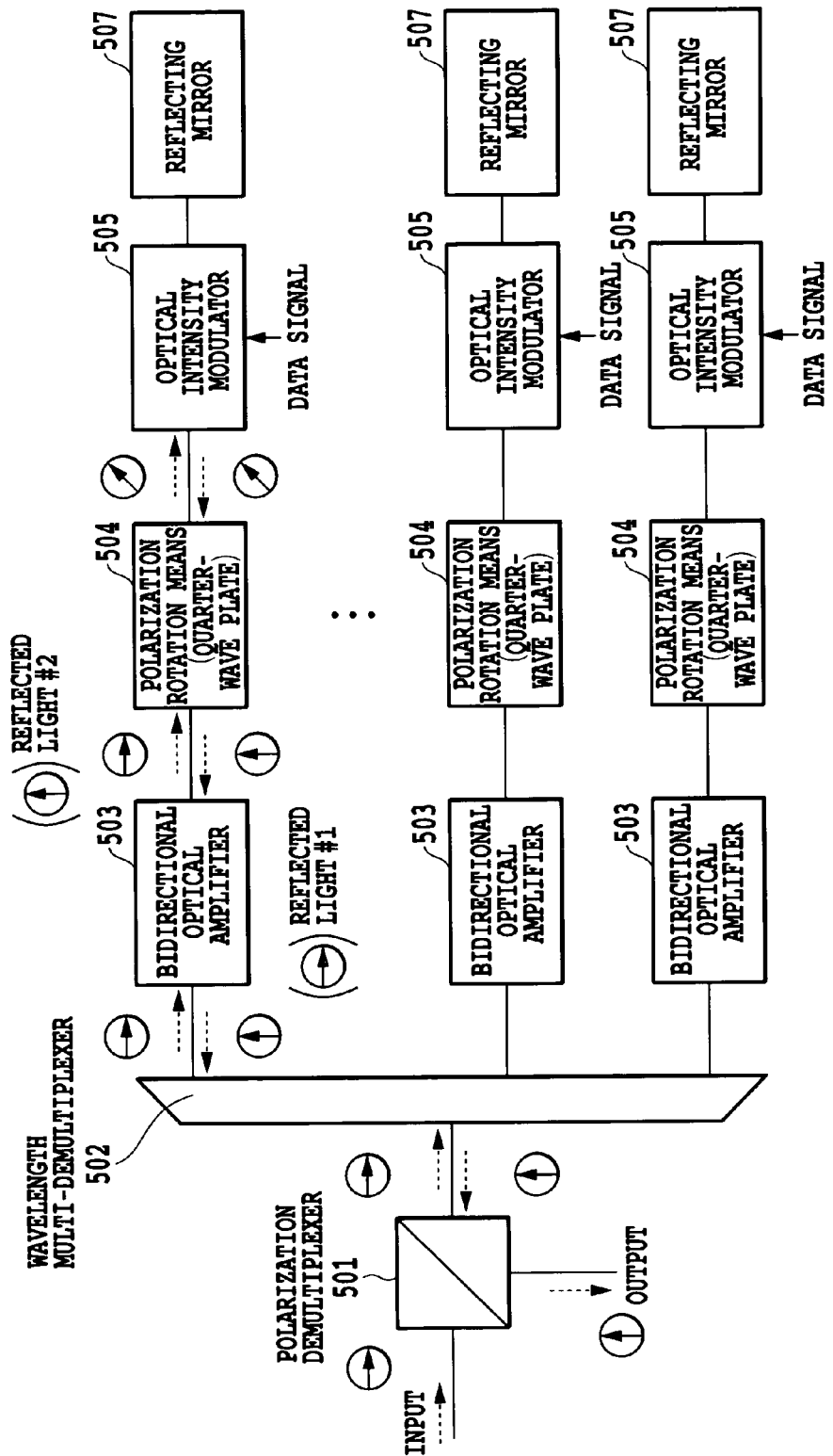
FIG. 15 is a schematic diagram illustrating directions of planes of polarization in the fourth embodiment in accordance with the present invention.

However, in the configuration of the present embodiment having the polarization rotation means 504, the reflected light ray 1 and reflected light ray 2 from the bidirectional optical amplifiers 503 are orthogonal to the polarization direction of the continuous waves or modulated light rays traveling in the same direction as indicated by arrows enclosed by circles representing the directions of the planes of polarization in FIG. 15. Since the reflected light ray 1 and the modulated light rays have the polarization directions orthogonal to each other, the polarization demultiplexer 501 can separate them at the output. In addition, the reflected light ray 2 has the polarization direction orthogonal to that of the continuous waves, and maintain the polarization relationship after the reflected light ray 2 passes through the intensity modulation and become modulated light rays. Thus, the reflected light ray 2 can be separated from the continuous waves so as to output by the polarization demultiplexer 501 in the same manner as the reflected light ray 1. As a result, the intensity fluctuations due to the interference between the two light rays can be eliminated.

According to the configuration of the present embodiment, as shown in FIG. 15, the planes of polarization of the light rays are the same in the two directions on the paths from the outputs of the polarization rotation means 504 to the return to the polarization rotation means 504 after the reflection by the optical reflectors 507. Consequently, it is possible to use as the optical intensity modulators 505 an optical intensity modulator such as LiNbO$_3$ Mach Zehnder type optical intensity modulator capable of carrying out modulation only for a single input polarized wave.

Fifth Embodiment

FIG. 16 shows a configuration of the optical modulation apparatus of a fifth embodiment in accordance with the present invention. The system of the fifth embodiment has polarizers 506, which enable only single polarized waves to pass through, interposed before or after the optical intensity modulators 505 of the multi-wavelength collective optical modulation apparatus in the foregoing fourth embodiment (in FIG. 16, they are interposed after). Since the remaining configuration is the same as that of the fourth embodiment, the detailed description thereof is omitted here.

Generally speaking, the polarization extinction ratio between two orthogonal polarized waves deteriorates markedly when coupling a plurality of optical devices and fibers. According to the configuration shown in FIG. 16, since the planes of polarization of the light rays are the same in the two directions on the paths from the outputs of the polarization rotation means 504 to the return to the polarization rotation means 504 after the reflection by the optical reflectors 507, the polarizers 506 can be inserted into the optical paths. The insertion of the polarizers 506 can recover the polarization extinction ratio degraded.

OTHER EMBODIMENTS

The present invention has been described by way of example of preferred embodiments. However, the embodiments in accordance with the present invention are not limited to the foregoing examples, and a variety modifications such as replacement, changes, addition, increase or decrease in the number, or the changes in the geometry of the components of the configuration are all included in the embodiments in accordance with the present invention as long as they fall within the scope of the claims.

The invention claimed is:

1. An optical modulation apparatus comprising:
bidirectional optical amplifying means for transmitting a continuous wave with a single wavelength bidirectionally, and for providing the single wavelength light with a gain;
optical intensity modulation means for carrying out intensity modulation of the continuous wave whose optical power is amplified by said bidirectional optical amplifying means, by a transmission signal with a mark-to-space ratio of practically 1/2; and
optical regression means for feeding the continuous wave passing through the intensity modulation by said optical intensity modulation means back to said optical intensity modulation means, or back to said bidirectional optical amplifying means directly, wherein
a modulation section loss L (dB), which is defined as a difference between optical power of the input continuous wave to said optical intensity modulation means and optical power of output modulated light from said optical intensity modulation means to a gain G (dB) of said bidirectional optical amplifying means, is set in a range from 0 (dB) to 2G+3.0 (dB).

2. The optical modulation apparatus as claimed in claim 1, wherein the modulation section loss L (dB) is set at G+1.5 (dB).

3. The optical modulation apparatus as claimed in claim 1, wherein said bidirectional optical amplifying means is operated in an unsaturated region of the gain.

4. The optical modulation apparatus as claimed in claim 2, wherein said bidirectional optical amplifying means is operated in an unsaturated region of the gain.

5. The optical modulation apparatus as claimed in claim 1, wherein said optical intensity modulation means is a reflection type optical intensity modulator having an optical reflector constituting said optical regression means at a rear end of said optical intensity modulation means.

6. The optical modulation apparatus as claimed in claim 1, wherein said optical intensity modulation means is a transmission-type optical intensity modulator that is installed in an optical loop constituting said optical regression means formed via an optical circulator.

7. The optical modulation apparatus as claimed in claim 1, wherein said optical modulation apparatuses equal in number to multiplexed wavelengths are installed, and further comprise wavelength multi-demultiplexing means for demultiplexing continuous waves which are wavelength division multiplexed, for supplying each single wavelength to one of a plurality of said optical modulation apparatus, and for multiplexing modulated light rays output from said plurality of optical modulation apparatuses to be output.

8. An optical modulation apparatus comprising:
 a plurality of sets each of which includes:
  bidirectional optical amplifying means for transmitting single wavelength light bidirectionally which constitutes multi-wavelength light including a plurality of optical carriers, and for providing the single wavelength light with a gain;
  optical intensity modulation means for modulating the single wavelength light by transmitting the single wavelength light bidirectionally which is provided with the gain by said bidirectional optical amplifying means; and
  optical regression means for regressing the single wavelength light transmitting through said optical intensity modulation means to said optical intensity modulation means again, wherein said plurality of sets are provided in correspondence to the plurality of single wavelength light rays constituting the multi-wavelength light;
 wavelength multi-demultiplexing means for demultiplexing the multi-wavelength light into single wavelength light rays, for inputting the single wavelength light rays into said bidirectional optical amplifying means, and for multiplexing a plurality of single wavelength light rays output from said bidirectional optical amplifying means again;
 a plurality of polarization rotation means each interposed between said bidirectional optical amplifying means and said optical intensity modulation means, for rotating a plane of polarization of each one of the single wavelength light rays; and
 polarization demultiplexing means for supplying input multi-wavelength light to said wavelength multi-demultiplexing means, for separating from the input multi-wavelength light, output multi-wavelength light which has its plane of polarization rotated by said polarization rotation means and is output from said wavelength multi-demultiplexing means, and for outputting the demultiplexed output multi-wavelength light.

9. The optical modulation apparatus as claimed in claim 8, farther comprising polarizers interposed before or after said optical intensity modulation means.

10. The optical modulation apparatus as claimed in claim 2, wherein said optical intensity modulation means is a reflection type optical intensity modulator having an optical reflector constituting said optical regression means at a rear end of said optical intensity modulation means.

11. The optical modulation apparatus as claimed in claim 3, wherein said optical intensity modulation means is a reflection type optical intensity modulator having an optical reflector constituting said optical regression means at a rear end of said optical intensity modulation means.

12. The optical modulation apparatus as claimed in claim 2, wherein said optical intensity modulation means is a transmission-type optical intensity modulator that is installed in an optical loop constituting said optical regression means formed via an optical circulator.

13. The optical modulation apparatus as claimed in claim 3, wherein said optical intensity modulation means is a transmission-type optical intensity modulator that is installed in an optical loop constituting said optical regression means formed via an optical circulator.

14. The optical modulation apparatus as claimed in claim 2, wherein said optical modulation apparatuses equal in number to multiplexed wavelengths are installed, and further comprise wavelength multi-demultiplexing means for demultiplexing continuous waves which are wavelength division multiplexed, for supplying each single wavelength to one of a plurality of said optical modulation apparatus, and for multiplexing modulated light rays output from said plurality of optical modulation apparatuses to be output.

* * * * *